United States Patent
Mitsuoka et al.

(10) Patent No.: US 7,127,543 B2
(45) Date of Patent: Oct. 24, 2006

(54) ACCESS CONTROL APPARATUS AND ACCESS CONTROL METHOD

(75) Inventors: Yoshio Mitsuoka, Odawara (JP); Hiroshi Kuwabara, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 319 days.

(21) Appl. No.: 10/768,147

(22) Filed: Feb. 2, 2004

(65) Prior Publication Data

US 2005/0120222 A1  Jun. 2, 2005

(30) Foreign Application Priority Data

Nov. 27, 2003  (JP) .............. 2003-396625

(51) Int. Cl.
*G06F 13/14* (2006.01)
(52) U.S. Cl. .............. 710/305; 710/306; 710/100; 709/216; 709/217; 709/218; 709/219
(58) Field of Classification Search ........... 710/3, 710/305–306, 100; 709/216–219, 223, 229; 713/193
See application file for complete search history.

(56) References Cited

U.S. PATENT DOCUMENTS

| | | | |
|---|---|---|---|
| 6,683,883 | B1 | 1/2004 | Czeiger et al. |
| 6,754,718 | B1 | 6/2004 | Dobberpuhl et al. |
| 6,845,403 | B1 | 1/2005 | Chadalapaka |
| 2002/0091844 | A1 | 7/2002 | Craft et al. |
| 2002/0103913 | A1 | 8/2002 | Tawil et al. |
| 2003/0009444 | A1 | 1/2003 | Eidler et al. |
| 2003/0055972 | A1 | 3/2003 | Fuller et al. |
| 2003/0097607 | A1 | 5/2003 | Bessire |
| 2003/0105830 | A1 | 6/2003 | Pham et al. |
| 2003/0159058 | A1 | 8/2003 | Eguchi et al. |
| 2003/0163568 | A1 | 8/2003 | Kano et al. |
| 2003/0191932 | A1 | 10/2003 | Allen et al. |
| 2003/0236988 | A1* | 12/2003 | Snead .............. 713/193 |
| 2004/0064590 | A1 | 4/2004 | Starr et al. |
| 2004/0103220 | A1 | 5/2004 | Bostick et al. |

(Continued)

FOREIGN PATENT DOCUMENTS

EP  0 881 560 A2  5/1998

(Continued)

OTHER PUBLICATIONS

Great Britian Combined Search and Examination Report dated Aug. 20, 2004.

*Primary Examiner*—Rehana Perveen
*Assistant Examiner*—Kim T. Huynh
(74) *Attorney, Agent, or Firm*—Reed Smith LLP; Stanley P. Fisher, Esq.; Juan Carlos A. Marquez, Esq.

(57) ABSTRACT

In an access control system, accesses are controlled which are received from not only the same communication network, but also either one or a plurality of other communication networks. In this access control system, a channel processor of a storage control system accepts a log-in request containing a target IP address from a target host apparatus, and compares this target IP address with the own IP address stored in an iSCSI port. Based upon a comparison result, the channel processor judges a network relative logical distance of a target network with respect to a communication network containing the storage control system as to the target network containing a target host apparatus. Then, the channel processor permits an access of a permission access type corresponding to the judged network relative logical distance with respect to a target upper grade apparatus.

5 Claims, 7 Drawing Sheets

U.S. PATENT DOCUMENTS

2004/0139244 A1* 7/2004 Hufferd .................. 710/30
2004/0174893 A1  9/2004 Saito
2005/0022024 A1  1/2005 Hashimoto
2005/0044199 A1* 2/2005 Shiga et al. ............ 709/223
2005/0157730 A1* 7/2005 Grant et al. ............ 370/401

FOREIGN PATENT DOCUMENTS

| EP | 1117 028 A2 | 5/2000 |
|---|---|---|
| JP | 2002-318725 | 4/2001 |
| WO | WO 99/65207 | 6/1999 |

* cited by examiner

FIG. 3

HOST CONNECTING PARAMETER ENTRY TABLE (HP TABLE)

| HP TABLE ID = 「001B9c」 | |
|---|---|
| TABLE NUMBER | WHEN TABLE IS FORMED |
| HOST iSCSI NAME | INFORMATION WHICH IS EXCHANGED BY iSCSI |
| IP ADDRESS | INFORMATION WHICH IS EXCHANGED BY iSCSI |
| TCP/IP OPTION (PROTOCOL SPECIFIC INFORMATION ETC.) | INFORMATION WHICH IS EXCHANGED BY iSCSI |
| iSCSI OPTION (PROTOCOL SPECIFIC INFORMATION ETC.) | INFORMATION WHICH IS EXCHANGED BY iSCSI |
| FIRST iSCSI PARAMETER (CONNECTION NUMBER ETC.) | INFORMATION WHICH IS EXCHANGED BY iSCSI |
| SECOND iSCSI PARAMETER | WHEN NETWORK ADDRESS IS JUDGED |

HOST MANAGEMENT TABLE

| iSCSI NAME | HP TABEL ID | IP ADDRESS | PERMISSION ACCESS SORT |
|---|---|---|---|
| Com.host1 | 001B9c | 158.214.132.77 | READ/WRITE (RW) |
| Com.host2 | 001B31 | 158.214.135.101 | READ ONLY (RO) |
| Com.host3 | 00FB31 | 10.20.1.11 | REJECT (RJT) |
| ⋮ | ⋮ | ⋮ | ⋮ |

LUN FIRST MANAGEMENT TABLE

| iSCSI NAME | LUN |
|---|---|
| Com.host1 | 0,1,2,3,4,5 |
| Com.host2 | 6,7 |
| Com.host3 | 8,9 |
| ⋮ | ⋮ |

LUN SECOND MANAGEMENT TABLE

| LUN | LDEV# |
|---|---|
| 0 | A1 |
| 1 | A2 |
| 2 | A3 |
| ⋮ | ⋮ |

FIG. 4

LDEV MANAGEMENT TABLE

| LDEV#1 | STARTING ADDRESS | SIZE (KB) | .... |
|--------|------------------|-----------|------|
| A1 | AAAAAA | 2000 | .... |
| A2 | BBBBBB | 6000 | .... |
| A3 | CCCCCC | 8000 | .... |
| ⋮ | ⋮ | ⋮ | ⋮ |

PERMISSION ACCESS SORT SETTING RULE TABLE

| NET MASK | PERMISSION ACCESS SORT |
|----------|------------------------|
| 255.255.255.0 | RW |
| 255.255.0.0 | RO |
| 255.0.0.0 or 0.0.0.0 | RJT |

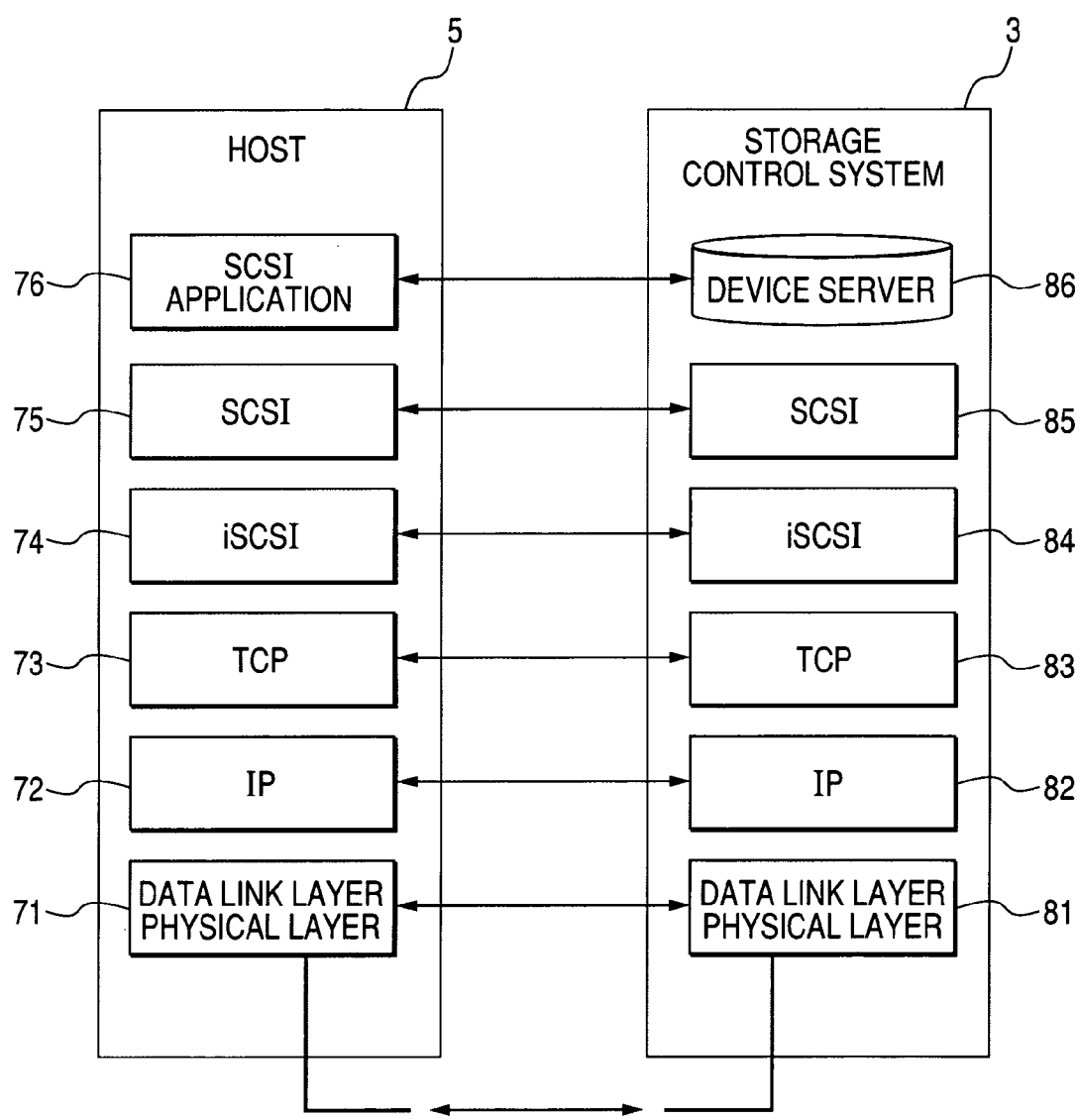

ACCESS CONTROL APPARATUS AND ACCESS CONTROL METHOD

CROSS-REFERENCES TO RELATED APPLICATIONS

This application relates to and claims priority from Japanese Patent Application No. 2003-396625, filed on Nov. 27, in 2003, the entire disclosure of which is incorporated herein by reference.

BACKGROUND OF THE INVENTION

The present invention is related to a technique for controlling an access which is received via a communication network from an external apparatus, concretely speaking, for instance, directed to a storage control apparatus for controlling an access in accordance with the iSCSI protocol, received via the communication network.

For instance, such a fibre channel connection storage control apparatus has already been known from, for example, JP-A-10-333839, and this fibre channel connection storage control apparatus controls accesses received form a plurality of upper grade apparatus via a fibre channel.

On the other hand, in IP-SAN (Internet Protocol-Storage Area Network), it is known that communication operations are carried out based upon such a communication protocol called as "iSCSI (symbol "SCSI" is abbreviated as "Small Computer System Interface)". The communication techniques operated based upon the iSCSI protocol own one major aspect, namely, how to prevent illegal accesses in order to improve security.

However, the access control technique made based upon the fibre channel, as described in above-described JP-A-10-333839, cannot be merely applied to the technique used to control the accesses based upon the iSCSI protocol. This reason is given as follows: That is, an access which is received via a fibre channel by a storage control apparatus must be equal to such an access which is issued from an upper grade apparatus connected to the same communication network. However, the first-mentioned access is not such an access which is issued from an undefined node connected to another communication network as explained in the access made based upon the iSCSI protocol. Concretely speaking, in accordance with the iSCSI protocol, there are some cases that, for instance, a storage control apparatus connected to a certain LAN (Local Area Network) may accept an access issued from an undefined information processing terminal via both another LAN and the Internet to which the last-mentioned LAN is connected.

As previously explained, in the communication technique established based upon the iSCSI protocol, one major aspect thereof is conceivable. That is, high security may be provided by executing such a way that how the access control operation is carried out. Also, this sort of major aspect may exist in such a system that accesses are accepted via either one or a plurality of other communication networks, but not via the same communication network, while this major aspect is not limited only to the above-explained iSCSI protocol.

SUMMARY OF THE INVENTION

As a consequence, an object of the present invention is to control accesses which are received via not only the same communication network, but also either one or a plurality of other communication networks. Concretely speaking, the object of the present invention is to control, for instance, such accesses which are received based upon the iSCSI protocol.

Other objects of the present invention may be come apparent from the below-mentioned descriptions.

BRIEF DESCRIPTION OF THE DRAWINGS

For a better understanding of the present invention, reference is made of a detailed description to be read in conjunction with the accompanying drawings, in which:

FIG. 3 illustratively shows a structure of a data table group 51 stored in a shared memory 47 of the storage control system 3;

FIG. 4 illustratively indicates another structure of the data table group 51 stored in the shared memory 47;

FIG. 5 illustratively represents a protocol structure in a communication operation related to the iSCSI protocol;

DESCRIPTION OF THE SPECIFIC EMBODIMENTS

Figure 1:
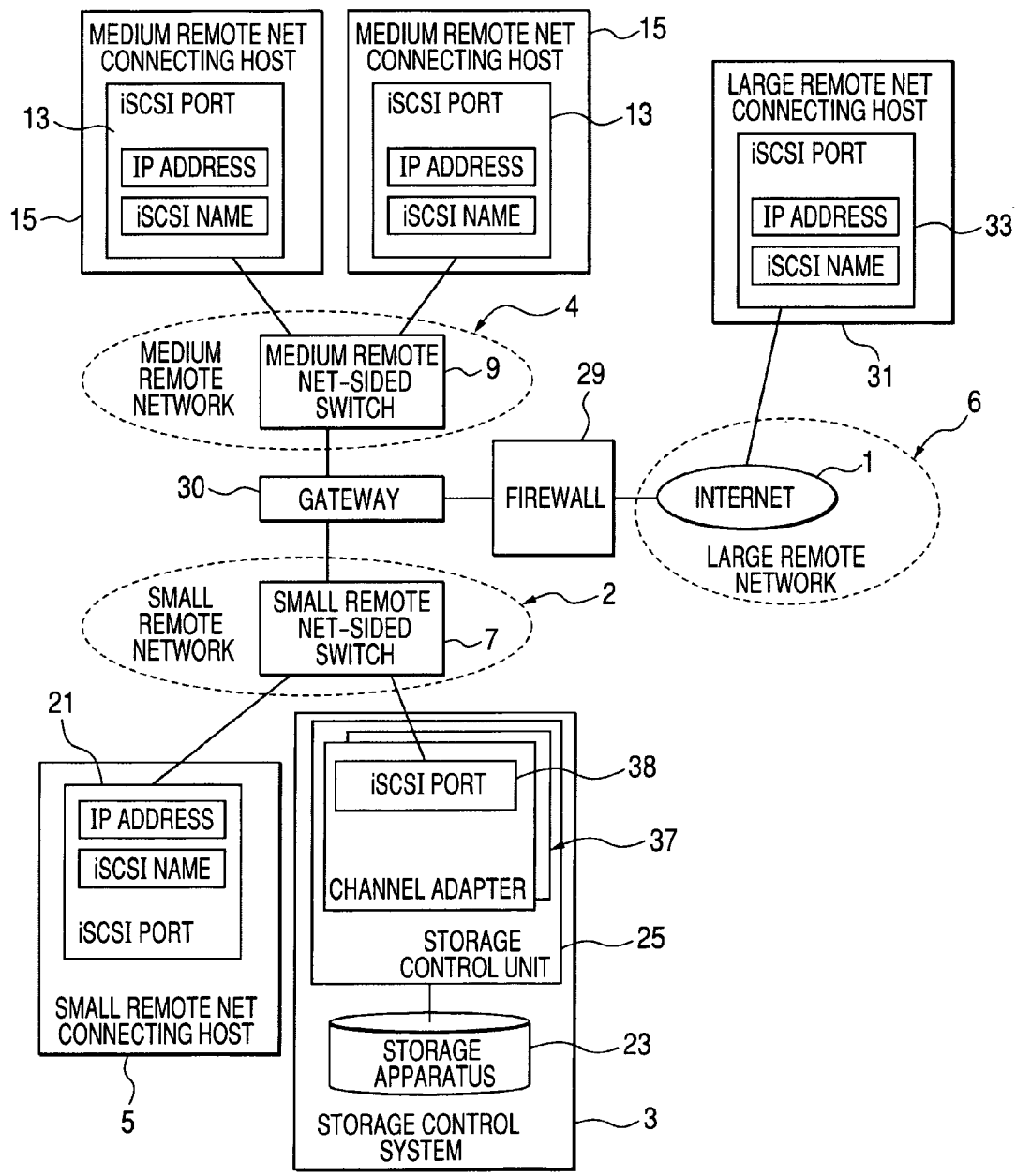
FIG. 1 schematically indicates an entire arrangement of an access control system according to an embodiment of the present invention.

A storage control apparatus, according to a first aspect of the present invention, corresponds to such a storage control apparatus which is connected via either one communication network or a plurality of communication networks to an upper grade apparatus, and is provided with either one piece or plural pieces of memories, a data storage apparatus (for instance, either physical storage device or logical storage device), and a channel adaptor.

Either one piece or plural pieces of the above-described memories (for example, nonvolatile memories) store thereinto plural sorts of permission access types. The permission access types correspond to plural sorts of target network attributes (for example, logical position, network sorts and the like) which represent attributes of target communication networks to which the upper grade apparatus is connected.

The data storage apparatus stores thereinto write data received from the upper grade apparatus and/or read data transmitted to the upper grade apparatus.

The channel adaptor is provided with an iSCSI port and either one set or plural sets of processors. The iSCSI port accepts an access issued from the upper grade apparatus via either one or plural communication networks. The processor performs a process operation with respect to information outputted from the iSCSI port. The channel adaptor accepts an access containing an IP address from the above-described target upper grade apparatus by way of the iSCSI port, judges a sort of the above-described target communication network based upon the IP address, identifies a permission access type corresponding to the judged target communication network with reference to information stored in either one or plural memories, and then permits an access of the identified permission access type as to the data storage apparatus with respect to the target upper grade apparatus.

Alternatively, a series of the above-explained process operations may be carried out by, for example, a protocol processing unit employed in the iSCSI port and/or by the channel processor solely, or in cooperation with the protocol processing unit.

In this case, an expression "communication network" implies a single communication network (for instance, either LAN or Internet) which is segmented in either a physical manner or a logical manner. Since a plurality of communication networks are connected to each other via either one sort or plural sorts of preselected switching apparatus, a single communication network group can be constructed. Concretely speaking, for example, either one or plural appliances which contain a storage control apparatus are connected to a first switching unit (for example, switch), so that a first communication network (for example, LAN) is constituted, to which either one or plural appliances have been connected. Similarly, either one or a plurality of first upper grade apparatus are connected to a second switching unit (for instance, switch), so that a second communication network (for example, LAN) is constituted, to which either one or a plurality of first upper grade apparatus have been connected. Then, the first switching unit is connected via a predetermined switching apparatus (for instance, gateway) to the second switching unit, so that a communication network group which contains both the first communication network and the second communication network is arranged.

Also, an "IP address" contained in an access issued from an upper grade apparatus may be equal to such an IP address owned by an access-source upper grade apparatus, which has been allocated in a target communication network to which the access-source upper grade apparatus is connected. Alternatively, this "IP address" may be equal to such a global IP address which has been allocated to a predetermined switching unit used to constitute a target communication network.

Also, the data storage apparatus may alternatively correspond to either one or plural logical devices to which, for example, either one or plural device identification codes (for instance, below-mentioned logical unit numbers) have been allocated respectively. Alternatively, the storage control apparatus may be arranged by that one, or more pieces of iSCSI ports are provided with either one or plural channel adaptor, and with respect to these one, or more pieces of iSCSI ports, either one or more than two logical devices are allocated to which an upper grade which has accessed each of the iSCSI ports can access. Then, device identification codes of either one or more than two logical devices which have been allocated to the respective iSCSI ports may be alternatively stored in a local memory of each of the iSCSI ports, or another memory. As a result, for instance, in such a case that an access containing a device identification code is received by a certain iSCSI port of the channel adaptor, this channel adaptor judges as to whether or not a device identification code allocated to this iSCSI port is made coincident with the device identification code contained in the access. When these device identification codes are not made coincident with each other, the channel adaptor may not alternatively permit the access, whereas when these device identification codes are made coincident with each other, the channel adaptor may alternatively permit this access.

In accordance with a first preferred embodiment of this storage control apparatus, either one piece or plural pieces of the above-described memories store thereinto a plurality of upper grade apparatus identification information corresponding to the plural upper grade apparatus respectively. In the case that the channel adaptor receives from the target upper grade apparatus, such an access containing the IP address and the target upper grade apparatus identification information, if this target upper grade apparatus identification information has not been stored in either one piece or plural pieces of memories, then the channel adaptor does not permit the access with respect to the above-described upper grade apparatus.

It should be noted that the above-explained upper grade apparatus identification information corresponds to, for example, an iSCSI name, an MAC address, or a manufacturing serial number of an upper grade apparatus etc.

In accordance with a second preferred embodiment of this storage control apparatus, either one piece or plural pieces of the memories store thereinto an IP address of the own apparatus which has been allocated to either the above-described iSCSI port or the above-explained storage control apparatus. The above-described target network attribute corresponds to such a network logical distance which indicates a logical distance between the communication network of the own apparatus to which the storage control apparatus is connected, and the above-explained target communication network. The plural sorts of access types correspond to the plural sorts of network logical distances, respectively. Furthermore, each of the plural sorts of access types implies such an access type that the longer the network logical distance corresponding thereto becomes, the smaller the accessible action number of the target upper grade apparatus with respect to the data storage apparatus is decreased. The channel adaptor judges the above-described network logical distance based upon the IP address of the own apparatus and the IP address.

In accordance with a third embodiment of this storage control apparatus, in the above-explained second embodiment, a permission access type corresponding to such a case that the above-described logical distance is small (for instance, may contain such a case that distance between network logical distance and communication network of own apparatus) is such a type implying that both a read operation and a write operation to the data storage apparatus are permitted with respect to the upper grade apparatus. Also, a permission access type corresponding to such a case that the network logical distance is medium is such a type implying that only a read operation within the read operation and the write operation to the data storage apparatus is permitted with respect to the upper grade apparatus. A permission access type corresponding to such a case that the network logical distance is large is equal to such a type implying that none of the read operation and the write operation to the data storage apparatus is permitted with respect to the upper grade apparatus.

In this case, for example, the larger a total number of the switching apparatus for connecting the communication network of the own apparatus to the target communication network becomes, the longer the network logical distance may alternatively become. Otherwise, for instance, the network logical distance may be alternatively increased every time a predetermined sort of either logical switching devices or physical switching devices are interposed irrespective of such a condition that a total number of switching apparatus becomes large, or small. In other words, for instance, a network logical distance between a first communication network and a second communication network may alternatively become different from each other, depending upon such a condition that how many and what sorts of logical, or physical switching devices are interposed between the first communication network and the second communication network. Also, for example, a network logical distance between a first communication network and a second communication network may alternatively become different from each other, depending upon such a condition that what sort of communication protocol is intervened between the first communication network and the second communication network. Concretely speaking, for example, when only one sort of communication protocol (as one example, only iSCSI protocol) is essentially interposed, the network logical distance may be small. When plural sorts of communication protocols (as one example, both iSCSI protocol and FC (Fibre Channel) protocol) are essentially present, the network logical distance may be alternatively large.

An access control apparatus, according to a second aspect of the present invention, corresponds to such an access control apparatus which is connected to an upper grade apparatus via either one or a plurality of communication networks. This access control apparatus is equipped with an access receiving means and an access control means. The access receiving means receives an access issued from a target upper grade apparatus (for example, access-source upper grade apparatus) via either one or a plurality of communication networks. The access control means identifies a target network attribute related to a target communication network to which the target upper grade apparatus is connected based upon information (for example, IP address) contained in the access issued from the target upper grade apparatus, then controls an access type which is permitted with respect to the target upper grade apparatus based upon the identified target network attribute.

In accordance with a first preferred embodiment of this access control apparatus, the access control apparatus is further provided with an access controlling information storage means (for example, either memory or hard disk) for storing thereinto plural sorts of permission access sorts which correspond to plural sorts of target network positions/types respectively, indicative of the logical positions and/or the types of the above-described target communication networks. The above-described access control means identifies the target network positions/types based upon the information (for example, IP address) contained in the access issued from the target upper grade apparatus, and identifies permission access types corresponding to the identified target network positions/types with reference to the information stored in the access controlling information storage means, and then permits the access corresponding to the identified permission access type with respect to the target upper grade apparatus.

As a target network position/type, for example, such a remote distance level, or an item for indicating a type itself such as a LAN and a SAN may be employed. The remote distance level indicates that how long the target network is logically separated from a communication network of the own apparatus in either a stepwise manner or a continuous manner.

In a second preferred embodiment of this access control apparatus, in the above-described first preferred embodiment, the above-described access control means receives the access containing the target IP address of the target upper grade apparatus from the target upper grade apparatus, and judges the target network position based upon the target IP address.

In this case, for example, a "target IP address" may be equal to such an IP address owned by an access-source upper grade apparatus, which has been allocated in a target communication network to which the access-source upper grade apparatus is connected. Alternatively, this "target IP address" may be equal to such a global IP address which has been allocated to a predetermined switching unit used to constitute a target communication network.

In a third preferred embodiment of this access control apparatus, in the above-described first preferred embodiment, the above-described access control-purpose information storage apparatus further stores thereinto an IP address of the own apparatus which has been allocated to the above-explained access control apparatus. The above-explained target network position is equal to a network logical distance which indicates a logical distance between the target communication network and the communication network of the own apparatus to which the access control apparatus is connected. While the plural sorts of access types correspond to the plural sorts of network logical distances respectively, each of the plural sorts of access types corresponds to such a type that implies that the larger the network logical distance corresponding thereto becomes, the smaller the accessible action number of the target upper grade apparatus is decreased. The access control means receives the access containing the target IP address of the target upper grade apparatus from the target upper grade apparatus, and judges the above-described network logical distance based upon both the IP address of the own apparatus and the target IP address.

In a fourth preferred embodiment of this access control apparatus, the access control apparatus is further provided with an access controlling information storage apparatus which stores thereinto a plurality of upper grade apparatus identification information corresponding to a plurality of upper grade apparatus, respectively. In the case that the access control means receives an access issued from the target upper grade apparatus, which contains the target upper grade apparatus identification information of the above-described target upper grade apparatus, if this target upper grade apparatus identification information is not stored in the access control storage apparatus, then the access control means does not permit the access with respect to the target upper grade apparatus.

In accordance with the storage control apparatus of the present invention, an access issued from a target upper grade apparatus is controlled based upon a position of the target communication network to which a target upper grade apparatus corresponding to an access source is connected. As a result, in the case that accesses are received via either one or plural communication networks, such an access control operation can be carried out based upon such a condition that an access source is such an upper grade apparatus which is connected to which communication network.

In accordance with the access control apparatus of the present invention, this access control apparatus identifies such a target network information equal to information related to a target communication network to which a target upper grade apparatus is connected based upon information contained in an access issued from the target upper grade apparatus. Then, the access control apparatus controls an access type permitted with respect to the target upper grade apparatus based upon the identified target network information. As a result, in the case that accesses are received via either one or plural communication networks, such an access control operation can be carried out based upon such a condition that an access source is such an upper grade apparatus which is connected to which communication network.

Subsequently, as the case that the accesses are received via either one or plural communication networks, such a case that accesses issued based upon the iSCSI protocol are received will be exemplified, and an embodiment of the present invention will be explained with reference to drawings.

FIG. 1 schematically shows an entire arrangement of an access control system according to an embodiment of the present invention.

In this access control system, a plurality of communication networks are mutually connected to each other so as to constitute a single network group. The plurality of communication networks contain a communication network 2, and either a communication network 4 or a communication network 6, which are relatively separated apart from this communication network 2 by a predetermined logical distance (will be referred to as "network relative logical distance" hereinafter). In the communication network 2, a storage control system 3 is contained. Concretely speaking, for instance, the plural communication networks contain a "small remote network" 2, a "medium remote network" 4, and a "large remote network" 6. In the small remote network 2, a network relative logical distance is zero, or a small degree. In the medium remote network 4, a network relative logical distance is a medium degree. In the large remote network 6, a network relative logical distance is a large degree.

In this connection, an expression "network relative logical distance is zero, or small degree" implies the communication network 2 itself where the storage control system 3 is present, or implies such a switching device that a sort of physical, or logical intervening device interposed between this communication network 2 and a connection destination network thereof is the same as a small remote net-sided switch 7 (will be discussed later) Alternatively, this expression implies that a total number of interposed switching devices is small (for example, one piece of interposed switching device)

Also, another expression "network relative logical distance is medium degree" implies that, for instance, a predetermined sort of the above-explained interposed devices (for example, gateways) are present between the small remote network 2 and the connection destination network thereof (otherwise, total number of interposed switching devices is medium degree).

Also, another expression "network relative logical distance is large degree" implies that, for example, instead of, or in addition to the above-described predetermined sort of intervening devices (for instance, gateways), another sort of the above-described intervening devices (for instance, firewalls) are located between the small remote network 2 and the connection destination network thereof (alternatively, total number of interposed switching devices is large).

The small remote network 2 is constituted by that either one or a plurality of node appliances are connected to a network constructing appliance (for example, hub) such as the small remote net-sided switch 7. To this small remote net-sided switch 7, either one or a plurality of host apparatus (will be referred to as "small remote net connecting host" hereinafter) 5, and a storage control system 3 are connected. This storage control system 3 receives an access issued from a host apparatus 5, another host apparatus 15, or another host apparatus 31.

The small remote net connecting host 5 corresponds to a computer machine such as a personal computer and a PDA (Personal Digital Assistants). The small remote net connecting host 5 is equipped with an iSCSI port 21 which is used to perform a communication operation based upon the iSCSI protocol. Since this iSCSI port 21 is connected to the small remote net-sided switch 7, the small remote net connecting host 5 can carry out the communication operation based upon the iSCSI protocol. A storage media (will be referred to as "port memory" hereinafter) such as a memory is provided with the iSCSI port 21. Both an IP address allocated to the small remote net connecting host 5 and a specific iSCSI name have been stored in this port memory.

The storage control system 3 is provided with a storage apparatus 23 and a storage control unit 25. The storage apparatus 23 contains a plurality of physical disk groups (for example, hard disk group). The storage control unit 25 controls an access to the storage apparatus 23 issued from the host apparatus 5, 15, or 31. This storage control unit 25 is equipped with a plurality of channel adaptor sets 37 which control communication operations between the own channel adaptor sets 37 and the host apparatus 5, 15, or 31. An iSCSI port 38 is mounted on each of channel adaptors contained in the channel adaptor sets 37. Since this iSCSI 38 is connected to the small remote net-sided switch 7, the storage control system 3 can carry out a communication operation based upon the iSCSI protocol.

The medium remote network 4 is constructed by that either one or a plurality of node appliances are connected to a network construction-purpose appliance (for example, hub) such as a medium remote net-sided switch 9. Either one or a plurality of host apparatus (will be referred to as "medium remote net connecting host" hereinafter) 15 are connected to the medium remote net-sided switch 9.

Similar to the small remote net connecting host 5, the medium remote net connecting host 15 corresponds to a computer machine such as a personal computer and a PDA (Personal Digital Assistants). The medium remote net connecting host 15 is also equipped with an iSCSI port 13. Since this iSCSI port 13 is connected to the medium remote net-sided switch 9, this medium remote net connecting host 15 can carry out the communication operation based upon the iSCSI protocol. A port memory is provided with the iSCSI port 13. Both an IP address allocated to the medium remote net connecting host 15 and a specific iSCSI name have been stored in this port memory.

The large remote network 6 is constructed by that either one or a plurality of node appliances are connected to the Internet 1 in a communicatable manner. Either one or a plurality of node appliances correspond to, for instance, a host apparatus (will be referred to as "large remote net connecting host" hereinafter) 31.

Similar to the small remote net connecting host 5, the large remote net connecting host 31 corresponds to a computer machine such as a personal computer and a PDA (personal Digital Assistants). The large remote net connecting host 31 is also equipped with an iSCSI port 33. Since this iSCSI port 33 is connected to the large remote net-sided switch 31, this large remote net connecting host 31 can carry out the communication operation based upon the iSCSI protocol. A port memory is provided with the iSCSI port 33. Both an IP address allocated to the large remote net connecting host 33 and a specific iSCSI name have been stored in this port memory.

The small remote net-sided switch 7 of the above-described small remote network 2 is connected to the medium remote net-sided switch 9 of the medium remote network 4 via a gateway 30 (for example, predetermined protocol converting machine for converting command made based upon iSCSI protocol and command made based upon FC protocol with each other). Also, the gateway 30 is connected via a firewall 29 to the Internet 1. As a result, the small remote network 2 is connected to both the medium remote network 4 and the large medium remote network 6. Under this environment, the storage control system 3 can be communicated with any one of the net connecting hosts 5, 15, and 31.

Figure 2:
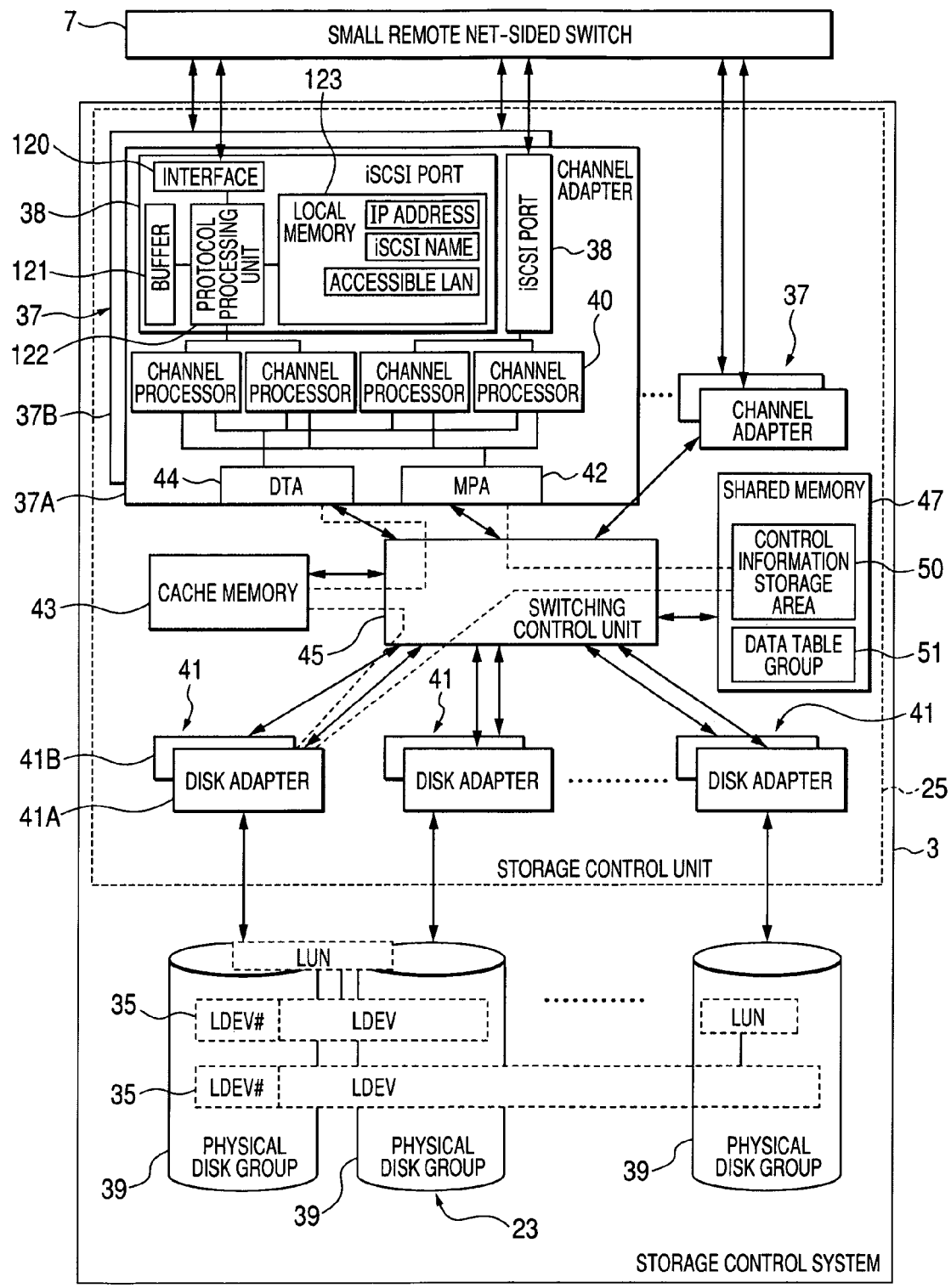
FIG. 2 is a schematic block diagram for showing a hardware structure of a storage control system 3 employed in the access control system of FIG. 1.

FIG. 2 is a schematic block diagram for showing a hardware structure of the storage control system 3.

The storage control system 3 corresponds to, for instance, a RAID (Redundant Array of Independent Inexpensive Disks) system. As the storage apparatus 23, one, or more sets of physical disk groups 39 are provided which have a plurality of disk type storage apparatus arranged in an array shape. Either one or a plurality of logical devices (will be abbreviated as "LDEV" hereinafter) 35 corresponding to logical storage areas have been set to physical storage areas provided by these physical disk group 39. Identification information of these LDEVs (will be referred to as "LDEV#" hereinafter) has been allocated to the respective LDEVs 35, and further, a logical unit number (will be abbreviated as "LUN" hereinafter) has been applied to each of these LDEV#, while this LUN can designate the host apparatus 5, 15, or 31.

Also, the storage control system 3 is equipped with either one or a plurality of channel adaptor sets 37, a cache memory 43, a shared memory 47, either one or a plurality of disk adaptor sets 41, and a switching control unit 45.

Each of the channel adaptor sets 37 contains a plurality (typically two sets) of channel adaptors 37A and 37B. These channel adaptors 37A and 37B own the essentially same constructions. As a result, for instance, in such a case that the host apparatus 5, 15, or 31 cannot access via one channel adaptor 37A to a predetermined LDEV, this host apparatus 5, 15, or 31 accesses via the other channel adaptor 37B to the same predetermined LDEV (this technical idea is essentially similar to disk adaptor sets 41). Since the channel adaptors 37A and 37B own the essentially same constructions, the construction of the channel adaptor 37A will now be explained as a typical channel adaptor.

The channel adaptor 37A is equipped with either one or a plurality (for example, two pieces) of iSCSI ports 38 and 38, and is connected via this iSCSI port 38 to either one or a plurality of host apparatus 5, 15, and 31 under communicatable condition. The channel adaptor 37A may be constituted by a hardware circuit, software, or a combination of the hardware circuit and the software. The channel adaptor 37A performs a data communication operation between this storage control system 3 and the host apparatus 5, 15, or 31. The iSCSI port 38 is provided with an interface 120, a buffer 121, a local memory 123, and a protocol processing unit 122. The interface 120 owns a cable port which is physically connected to the small remote net-sided switch 7. The buffer 121 corresponds to such a memory which temporarily stores thereinto data transmitted/received between the storage control system 3 and the host apparatus 5, 15, or 31. The local memory 123 is, for example, a nonvolatile memory, and stores there into an IP address, an iSCSI name, and a LUN to which this iSCSI port 38 can access. The protocol processing unit 122 connected via a predetermined internal bus (for example, PCI bus) to the channel processors 40 and 40 under communicatable condition. This protocol processing unit 122 executes a protocol process operation in accordance with TCP/IP, iSCSI, and SCSI protocols (will be explained later) based upon information stored in both the buffer 121 and the local memory 123. It should be understood that the function capable of executing the protocol processing operation in accordance with the above-described TCP/IP, iSCSI, and SCSI protocols may be provided with the channel processor 40 instead of the protocol processing unit 122.

Also, one piece, or more pieces of microprocessors (will be referred to as "channel processors" hereinafter) 40 are also mounted on this channel adaptor 37A, and these microprocessors 40 are connected to the respective iSCSI ports 38 under communicatable condition. Furthermore, a microprocessor adaptor (will be abbreviated as "MPA" hereinafter) 42, and a data transfer adaptor (will be abbreviated as "DTA") 44 are mounted on the channel adaptor 37A. The microprocessor adaptor 42 is connected to the shared memory 47 under communicatable condition, whereas the data transfer adaptor 44 is connected to the cache memory 43 under communicatable condition. In such a case that the channel processor 40 transmits/receives control information (for example, message transmitted/received between processors) with respect to an external processor (concretely speaking, microprocessors provided in disk adaptors 41A and 41B, and are not shown in drawings), the control information is transmitted/received via the MPA 42. Both in the case that write data is written from the host apparatus 5, 15, or 31 into the LDEV 35, and also, in such a case that read data which has been read from the LDEV 35 is outputted from the storage control system 3 to the host apparatus 5, 15, or 31 both the write data and the read data pass through the DTA 44.

For example, each of the channel processors 40 may execute a polling operation as to the control information storage area 50 of the shared memory 47 so as to acquire the control information via the MPA 42; may read out the read data which has been stored in the cache memory 43 so as to transmit this read data to the host apparatus 5, 15, or 31; and may store such a data to be written (namely, write data) which has been received from the host apparatus 5, 15, or 31 into the cache memory 43.

The cache memory 43 corresponds to either a volatile memory or a nonvolatile memory. Into the cache memory 43, both write data and read data are temporarily stored. The write data is transferred from the channel adaptors 37A and 37B to the disk adaptors 41A and 41B of the disk adaptor set 41. The read data is transferred from the disk adaptors 41A and 41B to the channel adaptors 37A and 37B.

The shared memory 47 corresponds to a nonvolatile memory. The shared memory 47 is equipped with, for instance, the control information storage area 50 and the data table group 51. The above-described control information is stored in the control information storage area 50.

Each of the disk adaptor set 41 is provided with respect to each of the physical disk groups 39. Each of the disk adaptors 41A and 41B is provided with either one or a plurality of microprocessors (not shown). Since the process operation by this microprocessor is carried out, data is read, or written with respect to the LDEV 35 having the LDEV# corresponding to the LUN which is designated by the host apparatus, 5, 15, or 31.

The switching control unit 45 may be arranged, for example, as a high-speed bus such as an ultra high-speed crossbar switch which executes a data transfer operation by way of a high-speed switching operation. The switching control unit 45 is connected with the respective channel adaptors 37A and 37B, the respective disk adaptors 41A and 41B, the shared memory 47, and the cache memory 43 under communicatable manner. Either data or commands are transmitted/received via this switching control unit 45 among the respective channel adaptors 37A and 37B, the respective disk adaptors 41A and 41B, the shared memory 47, and the cache memory 43.

The above-described process operations describe an outline of the storage control system 3 according to this embodiment. In response to an I/O request issued from the host apparatus 5, 15, or 31, that storage control system 3 executes a process operation based upon a content of this I/O request.

Subsequently, an outline as to process flow operations of an I/O request executed in the storage control system 3 will be explained by exemplifying such a case that the host apparatus 5 issues this I/O request. In this outline explanation, the process flow operations are subdivided into such a case that the issued I/O request indicates a read request, and such a case that the issued I/O request represents a write request.

(1) In the case that the I/O request indicates the read request:

The I/O request issued from the host apparatus 5 is stored into the buffer 121 of the iSCSI port 38. The channel processor 40 reads out this stored I/O request, and judges as to whether or not data required to be read (namely, read data) in this I/O request is present in the cache memory 43.

In the case that a judgement result becomes "YES", namely the read data is present in the cache memory 43 (namely, in case of "cache hit"), the channel processor 40 acquires the read data from the cache memory 43 via the DTA 44, and then transmits this acquired read data to the host apparatus 5 via the iSCSI port 38.

On the other hand, in such a case that the above-described judgement result becomes "NO", namely the read data is not present in the cache memory 43 (namely, in case of "cache mis"), the channel processor 40 stores such a control information into the shared memory 47 via the MPA 42. This control information is used to instruct a microprocessor (will be referred to as "disk processor" hereinafter) of the disk adaptor 43A in such a manner that this disk processor once reads such a read data within the predetermined LDEV 35 in the cache memory 43. Since the disk processor reads this control information, the read data is read out from the predetermined LDEV 35 and is stored in the cache memory 43 by this disk processor. Thereafter, the channel processor 40 acquires this read data from the cache memory 43, and then transmits the acquired read data to the host apparatus 5.

(2) In the case that the I/O request indicates the write request:

The I/O request containing write data, which is outputted from the host apparatus 5 is stored into the buffer 121 of the iSCSI port 38. The channel processor 40 reads out this stored I/O request, and judges as to whether or not data is located in a predetermined area (will be referred to as "predetermined cache slot" hereinafter) of the cache memory 43.

In the case that a judgement result becomes "YES", namely the data is located in the predetermined cache slot of the cache memory 43 (namely, in case of "cache hit"), the channel processor 40 overwrites the write data contained in the read I/O request with respect to the data stored in the predetermined cache slot.

On the other hand, in such a case that the above-described judgement result becomes "NO", namely the data is not located in the predetermined cache slot (namely, in case of "cache mis"), the channel processor 40 instructs the drive control unit 107 to once read in the cache memory 43, such a data from the LDEV which is specified by the read I/O request. As a result, if data is read out from this data storage area to be stored into the predetermined cache slot by the disk adaptor 107, then the channel processor 40 overwrites the write data contained in the I/O request with respect to the data stored in the predetermined cache slot.

As explained above, when the write data has been written into the cache memory 43, a completion notification is returned from the storage control system 30 to the host apparatus 5 while it is regarded that this write request has been ended. Generally speaking, at such a time instant when the write data is written in the cache memory 43, this data is not yet reflected to the predetermined LDEV 35. Thereafter, the write data is read out from the cache memory 43 so as to be written into the predetermined LDEV by the disk processor.

The above-described process operation implies the outline of the data read/write process operations executed in the storage control system 3.

A major unit as to the access control system according to this embodiment will now be described in detail.

FIG. 3 and FIG. 4 illustratively show a construction of the data table group 51 which is stored in the shared memory 47.

As indicated in FIG. 3, the data table group 51 contains a host connecting parameter entry table (will be referred to an "HP table" hereinafter) 53, a host management table 57, a LUN first management table 59, a LUN second management table 60. As shown in FIG. 4, this data table group 51 also contains an LDEV management table 61 and a permission access type setting rule table 63.

As indicated in FIG. 3, the HP table 53 corresponds to such a table which is prepared for each of the host apparatus 5, 15, and 31. An HP table ID (identification information) and various sorts of communication information which are required for a communication operation based upon the iSCSI protocol are registered in this HP table 53. In these various sorts of communication information, for example, a host iSCSI name, an IP address, a TCP/IP option, an iSCSI option, a first iSCSI parameter, and a second iSCSI parameter are registered. Among the above-described information, the host iSCSI name, the IP address, the TCP/IP option, the iSCSI option and the first iSCSI parameter correspond to such information which is received from a host apparatus when this host apparatus issues a log-in request based upon the iSCSI protocol. The second iSCSI parameter corresponds to such information which is determined when a network address is judged (will be explained). As a consequence, the "host iSCSI name" corresponds to an iSCSI name which is allocated to a host apparatus (concretely speaking, iSCSI port of this host apparatus) of a log-in request source. The "IP address" corresponds to such an IP address which is allocated to a host apparatus (concretely speaking, iSCSI port of this host apparatus) of a log-in request source, or corresponds to such a global IP address which is allocated to a switching device (for instance, gateway) provided in a network to which this host apparatus is connected. The "TCP/IP option" corresponds to such information which contains, for example, TCP/IP protocol specific information, information as to whether or not DHCP (Dynamic Host Configuration Protocol) is used, and/or information as to whether or not DNS (Domain Name System) is used. The "iSCSI option" corresponds to such information which contains iSCSI protocol specific information, information as to whether or not CHAP (Challenge Handshake Authentication Protocol) is used, and/or a time out value. The "first iSCSI parameter" corresponds to such information which contains at least a total connection number, and iSCSI transfer length/transfer number. The "second iSCSI parameter" corresponds to such information which contains a permission access type. There are plural sorts as to the permission access types. For instance, these permission access types involve "RW" which implies that both a read operation and a write operation are permitted; "RO" which implies that only a read operation within the read operation and the write operation is permitted; and "RJT" (abbreviated word of "reject") which implies that none of a read operation and a write operation is permitted.

Various sorts of information used to control accesses from host apparatus is stored in the host management table 57. Concretely speaking, HP table IDs, IP addresses, and permission access types, which correspond to the respective plural host iSCSI names, are in this host management table 57. Under initial condition, only the host iSCSI names have been registered in the host management table 57, and other information is brought into a blank condition. In such a case that an IP address received by the storage control system 3 when a log-in request is issued from the host apparatus 5, 15, or 31 to the storage control system 3 corresponds to a global IP address, there are some cases that the same IP addresses are set to the host management table 57 with respect to two, or more sorts of iSCSI names.

Such information that a designation of which LUN is accepted from which host apparatus 5, 15, or 31 is registered in the LUN first management table 59. Concretely speaking, for example, one, or more sets of LUNs corresponding to a plurality of iSCSI names (namely, a plurality of host apparatus) are registered in the LUN first management table 59. These LUNs may be previously prepared by a user under initially perfect condition. Alternatively, these LUNs may be edited by a user at proper timing.

Such information that which LUN corresponds to which LDEV# is registered in the LUN second management table 60. Concretely speaking, for instance, the LDEV# corresponding to the plural sorts of LUNs respectively have been registered in the LUN second management table 60.

As indicated in FIG. 4, information related to the respective LDEVs 35 is registered in the LDEV management table 61. Concretely speaking, for instance, LDEV#, starting addresses, data storage sizes, and the like, which correspond to the respective plural LDEVs 35, are registered in the LDEV management table 61.

Such information that which access type is allowed with respect to a log-in request source host when which IP address is received is registered in the permission access type setting rule table 63. Concretely speaking, for example, permission access types (for example, any one of "RW", "RO", and "RJT") which correspond to the plural sorts of net masks respectively have been registered in the permission access type setting rule table 63.

It should be noted that a net mask is used in order to judge as to whether or not a log-in request source host belongs to which network based upon an IP address (will be referred to as "target IP address" hereinafter) of a log-in request side when a log-in request of a host apparatus is received, and another IP address (will be referred to as "own IP address" hereinafter) which has been stored in the iSCSI port 38 of the storage control system 3.

For instance, as represented in this drawing, when an IP address contains four numerals which are segmented by (period), a net mask "255.255.255.0" implies that 3 beginning (left side) numerals in both a target IP address and the own IP address are identical to each other, and a 1 last numeral is different from the first-mentioned three numerals. In other words, this net mask implies that a network relative logical distance is a small degree (for example, zero). That is to say, for instance, with respect to the small remote net connecting host 5 belonging to the small remote network 2 (see FIG. 1), "RW" is set as the permission access type.

Also, a net mask "255.255.0.0" implies that 2 beginning numerals in both a target IP address and the own IP address are identical to each other, and 2 remaining numerals are different from the first-mentioned two numerals. In other words, this net mask implies that a network relative logical distance is a medium degree. That is to say, for instance, with respect to the medium remote net connecting host 15 belonging to the medium remote network 4 (see FIG. 1), "RO" is set as the permission access type.

Also, a net mask "255.0.0.0" implies that first 1 numeral in both the target IP address and the own IP address is the same, and 3 remaining numerals are different from the first-mentioned numeral. Also, a net mask "0.0.0.0." implies that the same numerals are not completely present at the same places as to the target IP address and the own IP address. In other words, these two netmasks "255.0.0.0" and "0.0.0.0" imply that network relative logical distances are large degrees. That is to say, with respect to the large remote net connecting host 31 belonging to the large remote network 6 (see FIG. 1), "RJT" is set as the permission access type.

The above-described explanations are made as to the various sorts of tables contained in the data table group 51. It should also be noted that at least one table contained in the data table group 51 may be stored in any place other than the shared memory 47, for example, the physical disk group 39, or the local memory (for example nonvolatile memory) 123 of the iSCSI port 38.

FIG. 5 illustratively shows a protocol construction used in a communication operation related to iSCSI. FIG. 6 represents structures of commands which are transmitted/received in this communication operation.

As shown in FIG. 5, in order to perform a communication operation based upon the iSCSI protocol, the host apparatus 5 (15, or 31) is provided with a physical layer and data link layer 71, an IP protocol layer 72, a TCP protocol layer 73, an iSCSI protocol layer 74, a SCSI protocol layer 75, and also, a SCSI application layer 76, which are sequentially ordered from a lower grade layer to an upper grade layer.

On the other hand, the storage control system 3 is provided with a physical layer and data link layer 81, IP protocol layer 82, a TCP protocol layer 83, an iSCSI protocol layer 84, a SCSI protocol layer 85, and also, a device server layer 86, which are sequentially order from a lower grade layer to an upper grade layer.

Figure 6A:
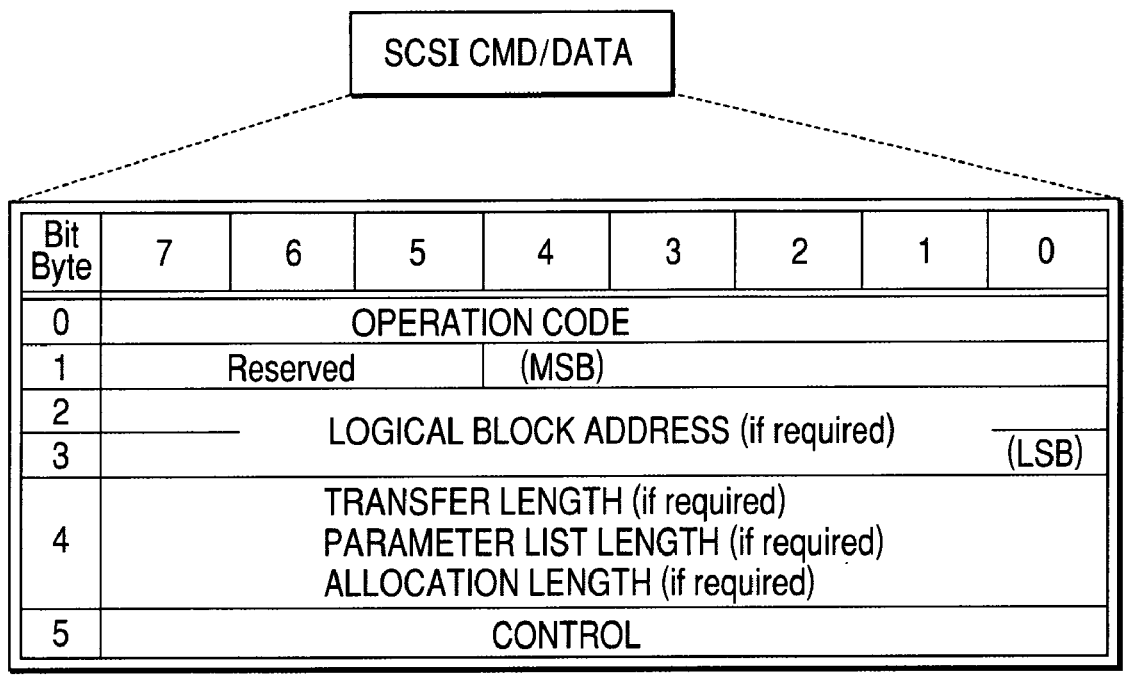
FIG. 6 illustratively indicates a structure of commands which are transmitted/received in the communication operation related to the iSCSI protocol.
Figure 6B:
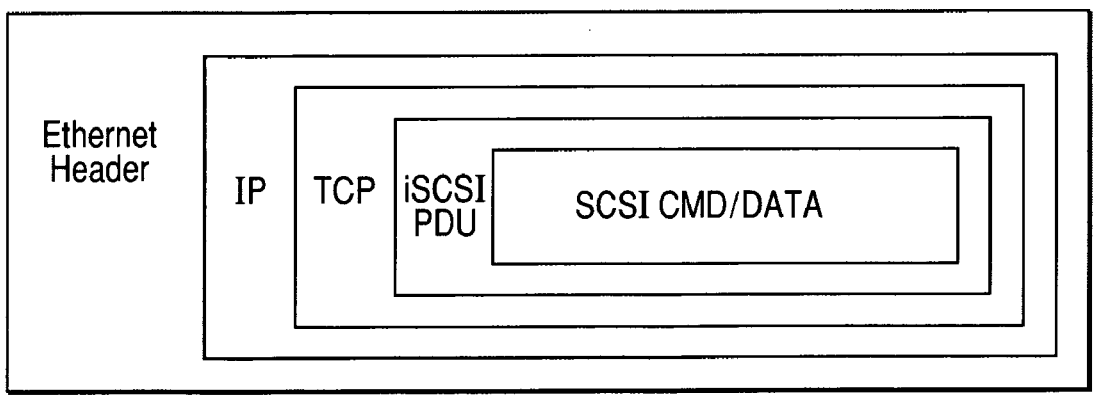

As exemplified in FIG. 6A, a command which is outputted from the SCSI application layer 76 of the host apparatus 5 via the SCSI protocol layer 75 corresponds to a command frame containing both a command and data (otherwise only command). Concretely speaking, this command frame is such a 6-byte command frame in which either a write operation code or a read operation code is contained in a head byte. Then, when this command frame is reached to the iSCSI protocol layer 74 and then is outputted from this iSCSI protocol layer 74 and from the data link layer/physical layer 71, this command frame becomes such an information frame as shown in FIG. 6B, namely becomes such an information frame that an SCSI command packet is enclosed by an iSCSIPDU unit, a TCP packet, an IP packet, and an Ethernet head packet. It should also be understood that symbol "PDU" is an abbreviated term of "Protocol Data Unit", and this PDU contains a LUN which is designated by a host apparatus with respect to the storage control system 3, and a CDB (Command Descriptor Block).

Under the protocol structure shown in FIG. 5, both the data link layer/physical layers 71 and 81; both the IP protocol layers 72 and 82; the TCP protocol layers 73 and 83; the iSCSI protocol layers 74 and 84; both the SCSI protocol layers 75 and 85; both the SCSI application layer 76 and the device server layer 86 are successively brought into session, so that an I/O request outputted from the host apparatus is received by the storage control system 3, and this storage control system 3 executes a process operation based upon this I/O request.

For instance, under session condition between the data link layer and physical layer 71 and 81, since an ARP (Address Resolution Protocol) request is issued and an ARP response to this ARP request is made, MAC (Media Access Control) addresses of communication parties are acquired with each other. Under session condition between the IP protocol layers 72 and 82, since a "ping" request is issued and a "ping" response to this "ping" request is made, such a confirmation is carried out as to whether or not a counter party (IP address) is present. Concretely speaking, for example, the "pin" request is transmitted from a network (will be referred to as "target network" hereinafter) to which a log-in request source host has been connected to the storage control system 3. Also, under session condition between the TCP protocol layers 73 and 83, three packets for synchronizing the sequence numbers with each other are transmitted/received. Also under session condition between the iSCSI protocol layers 74 and 84, a connection of iSCSI is established by a log-in phase in which a log-in request is issued, and a log-in response to this log-in request is made (for example, IP address, iSCSI name of log-in request source host, and TCP port number are transmitted from target network to storage control system 3). Under session condition between the SCSI protocol layers 75 and 85, a SCSI command containing either a read request or a write request is transmitted from the host apparatus to the storage control system 3. Under session condition between the SCSI application layer 76 and the device server layer 86, write data is transmitted from the host apparatus to the storage control system 3, or the read data is transmitted from the storage control system 3 to the host apparatus.

Figure 7:
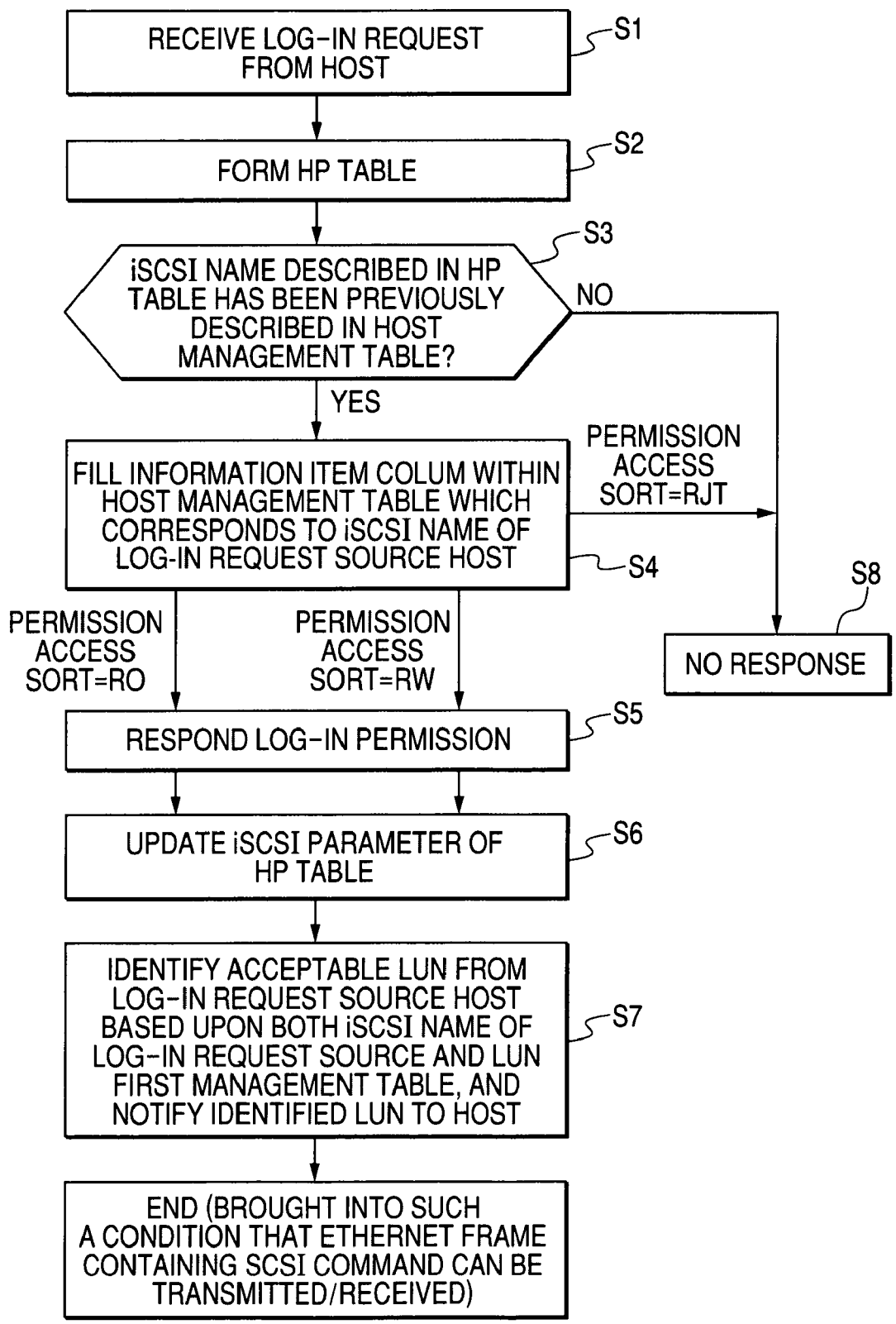
FIG. 7 is a flow chart for describing a process operation executed in the storage control system 3 as to access operation from a log-in request source host.

In this embodiment, the storage control system 3 controls an access (for example, either log-in request or access after this log-in) from a log-in request source host based upon the information received from the target network in the above-described log-in phase. Referring now to FIG. 7, a description is made of process flow operations for controlling an access from the log-in request source host, which is executed in the storage control system 3.

First, the protocol processing unit 122 of the iSCSI port 38 accepts a log-in request from a target network (step Si) This log-in request contains, for example, a TCP port number, an iSCSI name of a log-in request source host, and an IP address. This IP address corresponds to, for instance, an IP address of the log-in request source host, or a global IP address which is allocated to a switching device (for example, gateway) of the target network. All of the above-described information may be alternatively such information which has been entered by a user so as to be stored in a storage apparatus of a host apparatus, and then is read therefrom. Alternatively, all of the above-described information may be such information which has been acquired by the log-in request source host from a host management apparatus for managing one, or more sets of host apparatus belonging to the same network by DNS (Domain Name System).

In the step S1, when the iSCSI port 38 accepts the log-in request, the protocol processing unit 122 of the iSCSI port 38 performs a protocol processing operation (for instance, opening process operation of packet) with respect to this log-in request, and then transfers information (for example, TCP port number, iSCSI name of log-in request source host, IP address etc.) which has been obtained by this protocol process operation to a predetermined, or arbitrarily-selected target channel processor 40. Also, the protocol processing unit 122 produces an HP table ID, and then transfers this HP table ID to the target channel processor 40.

The target channel processor 40 prepares a new HP table 53 (namely, new HP table 53 corresponding to log-in request source host) which owns the HP table ID received from the protocol processing unit 122. Then, the target channel processor 40 writes the above-described host iSCSI name, IP address, TCP/IP option, iSCSI option, and first iSCSI parameter into the prepared HP table 53 based upon the information (for example, above-explained iSCSI name etc.) received from the protocol processing unit 122 (step S2).

Next, the channel processor 40 judges as to whether or not the host iSCSI name written in the new HP table 53 is made coincident with any one of the plural iSCSI names which have been previously registered in the host management table 57 (step S3).

In such a case that a negative result is obtained ("N" in step S3) as a result of the judgement in this step S3, the channel processor 40 subsequently issues no response with respect to the log-in request source host (step S8). In other words, under the iSCSI protocol, the channel processor 40 may return any one of two sorts of log-in responses via the protocol processing unit 122 as a log-in response to the log-in request, while the two sorts of log-in responses contain both "log-in permission" which implies that a log-in is permitted, and "log-in refuse" which implies that a log-in is not permitted. However, in this embodiment, when the negative result is obtained in the step S3, the channel processor 40 never returns even such a "log-in refuse" (in this case, it is so designed that connection is cut due to time out). As one modification of this embodiment, while two sorts of response types, namely, "non response" and "return response of log-in refuse" are prepared as the response type as to the permission access type "RJT", a response type may be alternatively selected based upon a type of a target network. In this modification, for example, when a network relative logical distance is merely large, "log-in refuse" may be selected as the response type, whereas when this network relative logical distance becomes further large, "non response" may be selected as the response type.

On the other hand, in such a case that a positive result is obtained as a result of the judgement in the step S3 ("Y" in step S3), the channel processor 40 fills an information item column within the host management table 57, which corresponds to an iSCSI name (will be referred to as "target iSCSI name" hereinafter) of the log-in request source host (step S4).

Concretely speaking, for example, the channel processor 40 writes the HP table ID of the new HP table 53 into an HP table ID column corresponding to the target iSCSI name.

Also, the channel processor 40 writes the target IP address received from the protocol processing unit 122 of the iSCSI port 38 into an IP address column corresponding to the target iSCSI name.

Also, the channel processor 40 executes a network address judging operation in which the target IP address is compared with the own IP address which is stored-by the iSCSI port 38 which has received the log-in request by employing the permission access type setting rule table 63 (in particular, plural sorts of netmask recorded in this permission access type setting rule table 63). Then, the channel processor 40 selects an arbitrary permission access type from a plurality of permission access types based upon a result of this comparing operation, and then writes the selected permission access type into a permission access type column corresponding to the target iSCSI name.

In the step S4, when the permission access type corresponds to both "RO" and "RW", the channel processor 40 notifies a log-in permission via the protocol processing unit 122 to the log-in request source host (step S5).

After the step S5, the channel processor 40 sets the above-explained selected permission access type as a second iSCSI parameter to the above-described new HP table 53 (step S6). Thereafter, the channel processor 40 acquires either one or a plurality of LUNs corresponding to the iSCSI name of the log-in request source from the LUN first management table 59, and then notifies the acquired one, or plural pieces of LUNs to the log-in request source host (step S7). As a result, the log-in phase is ended. Subsequently, the Ethernet frame (see FIG. 6B) which contains the SCSI command may be received.

It should also be noted that when the permission access type corresponds to "RJT" in the step S4, the channel processor 40 makes no response with respect to the log-in request source host (step S8).

Since a series of the above-described process flow operations are carried out, the permission access types which have been set every host apparatus 5, 15, and 31 are registered to the host management table 57, and thus, the log-in phase is ended. There after, for example, an access control operation is carried out in accordance with the below-mentioned manner.

First, the iSCSI port 38 receives an I/O request (Ethernet frame) containing an LUN from a host apparatus, and then this I/O request is temporarily buffered in the buffer 121 of the iSCSI port 38.

In this case, the protocol processing unit 122 judges as to whether or not the LUN contained in the I/O request which has been stored in this buffer 121 is made coincident with the accessible LUN which has been stored in the local memory 123, and when a negative judgement result is obtained, the protocol processing unit 122 executes a predetermined error process operation (for example, protocol processing unit 122 does not execute this I/O request by erasing I/O request).

On the other hand, when a result of this judgement becomes positive, the protocol processing unit 122 notifies this fact to the channel processor 40. The channel processor 40 identifies either an IP address contained in the I/O request which has been stored in the buffer 121 or a permission access type corresponding to the iSCSI name from the host management table 57. Then, the channel processor 40 compares the identified permission access type with such an access type which is indicated by the above-described I/O request in order to judge as to whether or not the permission access type is adapted to the access type.

In such a case that a result of this comparison becomes negative, the channel process 40 executes a predetermined error processing operation. Concretely speaking, for example, in the case that an I/O request is recognized as a write request irrespective of such a condition that a permission access type corresponds to "RO" (for example, in such a case that "write" is described in head byte of SCSI command shown in FIG. 6A), the channel processor 40 responds an error (for example, reception of illegal command) to the I/O request transmission source host. Alternatively, in such a case that the permission access type corresponds to "RO", after the log-in phase is accomplished, the channel processor 40 may notify to the log-in request source host, such a fact that the channel processor 40 can execute a read command, but cannot execute a write command, irrespective of such a condition as to whether or not the channel processor 40 has received the I/O request. Also, for instance, in such a case that the permission access type corresponds to "RW", after the log-in phase is accomplished, the channel processor 40 may notify to the log-in request source host, such a fact that the channel processor 40 can execute both a read command and a write command, irrespective of such a condition as to whether or not the channel processor 40 has received the I/O request.

On the other hand, when a result of the above-described comparison becomes positive (for example, when permission access type corresponds to "RW", such a recognition is made that I/O request corresponds to either read request or write request), the channel processor 40 acquires either one or a plurality of LUNs corresponding to the iSCSI name of the I/O request transmission source host from the LUN first management table 59, and then judges as to whether or not such an LUN which is made coincident with the LUN contained in the I/O request is present in the acquired one, or the acquired plural LUNs.

When a result of this judgement becomes negative, the channel processor 40 executes a predetermined error processing operation, for instance, the channel processor 40 instructs the I/O request issuing source host to designate a different LUN.

On the other hand, when a result of this judgement becomes positive, the channel process 40 acquires LDEV# corresponding to the LUN contained in the I/O request from the LUN second management table 60, and instructs a predetermined disk processor to read, or write data with respect to such an LDEV corresponding to the acquired LDEV#. As a result, the process operation is completed based upon the I/O request issued by the I/O request issuing source host.

The above-described process operations are explanations as to this embodiment. It should also be understood that in this embodiment, for instance, both the process operation explained with reference to FIG. 7, and the access control process operation executed after the permission access type has been set may be alternatively carried out by any structural element other than the channel processor 40, for example, by the protocol processing unit 122 of the iSCSI port 38. Alternatively, in this embodiment, for example, at least one of the IP address and the iSCSI name may be set specifically with respect to the storage control system 3, or may be set specifically with respect to each of the iSCSI ports 38. Further, in the log-in phase, instead of the iSCSI name, or in addition to the iSCSI name, another sort of host identification information (for instance, MAC address) may be alternatively transmitted from the target network to the storage control system 3.

As previously described, in accordance with the above-described embodiment, the permission address type is set as a result of the comparison between the target IP address and the own IP address, namely, based upon the above-described network relative logical distance. In other words, based upon such a condition that a communication network to which a log-in request source host belongs is located at a which place (namely, how long this place is logically separated from the communication network 2 covering the storage control system 3), an address type is determined which is executed by this log-in request source host. In other words, the levels of the respective communication networks 2, 4, and 6 are classified in response to the network relative logical distances of the respective communication networks 2, 4, and 6, while the communication network 2 containing the storage control system 3 is defined as the reference. Then, the permission access types are determined based upon the respective classified levels. As a result, the access control operation can be carried out in the unit of the communication network.

Also, in accordance with the above-explained embodiment, the storage control system 3 returns no response with respect to such an access operation made by a host apparatus belonging to a communication network from which a illegal access may be possibly issued. As a consequence, since existence of the storage control system 3 is not notified with respect to this host apparatus, higher security can be secured.

While the preferred embodiments of the present invention have been described in detail, this is made so as to merely exemplify the explanations of the present invention, and therefore, the technical scope of the present invention is not limited only to these embodiments and the modification. The present invention may be alternatively realized by way of other embodiments. For example, the inventive idea of the present invention may be applied not only to the communication environment based upon the iSCSI protocol, but also the various environments under which an access is received via either one or a plurality of communication networks. Also, for instance, such a table is prepared and this table defines such a corresponding relationship that which response is returned with respect to not only a read command and a write command, but also other sorts of SCSI command codes (abstractly speaking, access type). In the case that a SCSI command is received after a log-in request is issued, a content of a response may be alternatively selected based upon this table and a SCSI command code of this received SCSI command.

What is claimed is:

1. A storage access control apparatus connected via one or a plurality of communication networks to a plurality of upper grade apparatuses, comprising:
    a channel adaptor equipped with an iSCSI port for receiving an access request issued from the upper grade apparatuses via said one or a plurality of communication networks, and one or a plurality of channel processors executing a process operation with respect to information outputted from said iSCSI port;
    one or a plurality of memories for storing thereinto plural sorts of permission access types which individually correspond to plural sorts of target network attributes which belong to a target communication network to which at least one of said upper grade apparatuses is connected, said attributes including a network logical distance; and
    a data storage apparatus for storing thereinto write data received from said at least one of the upper grade apparatuses and/or read data transmitted to said at least one of the upper grade apparatuses,
    wherein said one or plural memories store thereinto a plurality of iSCSI names corresponding to the upper grade apparatuses respectively, and
    said channel adaptor receives an access request, an iSCSI name, and a IP address from said at least one of the upper grade apparatuses via said one or a plurality of communication networks, (1) if the iSCSI name is not already stored in the one or plural memories, denies a request to access said at least one of the upper grade apparatuses; (2) if the iSCSI name is already stored in the one or plural memories, judges an attribute of said target communication network based upon said received IP address, identifies a permission access type corresponding to said judged attribute of the target communication network with reference to information stored in said one or a plurality of memories, and then permits according to said identified permission access type the request to access said data storage apparatus issued from said at least one of the upper grade apparatuses.

2. A storage access control apparatus as claimed in claim 1, wherein
    said one or plural memories store thereinto an access control IP address thereof which is assigned to said iSCSI port or said at least one of the upper grade apparatuses,
    said target network attribute corresponds to a network logical distance between the communication network to which said storage control apparatus is connected, and said target communication network,
    said plural sorts of access types are defined in correspondence with said plural sorts of network logical distances such that the larger said network logical distance corresponding to the access type becomes, the smaller an accessible action time with respect to said data storage apparatus of said at least one of the upper grade apparatuses is, and
    said channel adaptor judges said network logical distance based upon both said access control IP address and said access request IP address.

3. A storage access control apparatus as claimed in claim 2, wherein
    a small network logical distance corresponds to a permission access type which permits both a read operation and a write operation to said data storage apparatus according to the access request issued from said at least one of the upper grade apparatuses,
    a medium network logical distance corresponds to a permission access type which permits only a read operation to said data storage apparatus according to the access request issued from said at least one of the upper grade apparatuses, and
    a large network logical distance corresponds to a permission access type which denies both a read operation and a write operation to said data storage apparatus according to the access request issued from said at least one of the upper grade apparatuses.

4. A storage access control apparatus as claimed in claim 1, wherein
    said access request is log-in request and,
    said channel adaptor is arranged, upon receipt of the access request and iSCSI name, to refuse the log-in request to said at least one of the upper grade apparatuses if the iSCSI name is not already stored in the one or a plurality of memories.

5. A storage access control apparatus as claimed in claim 4, wherein
    when said channel adaptor receives the log-in request, said channel adaptor prepares a table which has a table ID,
    said channel adaptor writes the iSCSI name, the IP address, and the identified permission access type into the table, and
    said channel adaptor permits the log-in request to said at least one of the upper grade apparatuses if the iSCSI name is already stored in said one or a plurality of memories.

* * * * *